(12) United States Patent
Stewart

(10) Patent No.: US 6,449,534 B1
(45) Date of Patent: Sep. 10, 2002

(54) METHOD AND APPARATUS FOR OPTIMIZING ENVIRONMENTAL TEMPERATURE FOR A DEVICE UNDER TEST

(75) Inventor: Robert T. Stewart, La Mesa, CA (US)

(73) Assignee: Sigma Systems Corporation, San Diego, CA (US)

( * ) Notice: Subject to any disclaimer, the term of this patent is extended or adjusted under 35 U.S.C. 154(b) by 0 days.

(21) Appl. No.: 09/268,900

(22) Filed: Mar. 16, 1999

(51) Int. Cl.[7] ............................................. G05D 23/00
(52) U.S. Cl. ..................... 700/299; 700/205; 702/130
(58) Field of Search ..................... 700/153, 71, 202, 700/205, 299, 300, 204; 702/130, 132, 136; 236/78; 62/208

(56) References Cited

U.S. PATENT DOCUMENTS

| | | | |
|---|---|---|---|
| 4,734,872 A | * 3/1988 | Eager et al. | 700/153 |
| 4,816,647 A | 3/1989 | Payne | 219/488 |
| 4,925,089 A | * 5/1990 | Chaparro et al. | 236/78 |
| 5,197,375 A | 3/1993 | Rosenbrock et al. | 99/328 |
| 5,205,132 A | * 4/1993 | Fu | 236/15 |
| 5,224,836 A | 7/1993 | Gunn et al. | 392/307 |
| 5,367,601 A | 11/1994 | Hannabery | 417/14 |
| 5,420,521 A | 5/1995 | Jones | 324/760 |

* cited by examiner

Primary Examiner—Leo Picard
Assistant Examiner—Kidest Bahta
(74) Attorney, Agent, or Firm—Gazdzinski & Associates

(57) ABSTRACT

A method and associated algorithm for controlling and optimizing the temperature of a device under test (DUT) through calculation of a moving setpoint which varies from the user-specified DUT core temperature. The method generally comprises (i) calculating a system operating range based on limits imposed by the DUT, associated temperature control system, and thermal conditioning equipment; (ii) determining the allowable operating range for the DUT based on permissible DUT stress and DUT core temperature; and (iii) calculating a control setpoint based on DUT and conditioning system temperature data, one or more preselected setup factors, and the system and DUT operating ranges. In another aspect of the invention, variable temperature differential limits are imposed on the CSP as a function of DUT core temperature in order to mitigate thermal shock to the DUT. A computer system and thermal conditioning system incorporating the above-described method and algorithm is also disclosed.

50 Claims, 12 Drawing Sheets

METHOD AND APPARATUS FOR OPTIMIZING ENVIRONMENTAL TEMPERATURE FOR A DEVICE UNDER TEST

BACKGROUND OF THE INVENTION

1. Field of the Invention

This invention relates to temperature control in systems wherein a device under test (DUT) is thermally conditioned (heated or cooled to some thermal state) by a thermal conditioning device that adds or removes heat to/from the device by convection, conduction, or radiation. More particularly, this invention discloses a method and apparatus for dynamically determining an optimum temperature profile for the conditioning device such that the DUT is conditioned as quickly as possible without exposing either the conditioning device or the DUT to unacceptable temperatures.

2. Description of Related Technology

The nature of heat transfer is such that a differential in temperature between two masses must exist before heat will flow between them. The greater the temperature differential, the greater the heat flow will be. This phenomenon operates equally for masses that are separate but adjacent and for masses that are adjacent parts of a monolithic whole.

The rate of transfer of heat within a mass having an internal temperature differential is regulated by that substance's resistance to heat flow; its thermal conductivity. Every substance exhibits a different and predictable thermal conductivity.

It follows that to change the temperature of the center of a mass (the "core") to some desired temperature, the outside surface of the mass (the "skin") must be exposed to a temperature beyond the desired core temperature for a time period adequate to allow the sufficient transfer of heat given the mass' thermal conductivity.

The foregoing concept is clearly illustrated by the everyday example of roasting meat within a conventional oven. The meat is roasted for a given period of time, as determined by its weight, at a comparatively high oven air temperature in order to achieve a desired lower internal or "core" temperature. The differential temperature causes heat to flow to the core of the meat, thereby raising its temperature.

As previously stated, the transfer of heat into or out of the core of a mass consumes a finite amount of time. This time has value, so there is an incentive to achieve the thermal objective (e.g., the desired core temperature) as quickly as possible. A simple solution to accelerating the heat transfer is to increase the temperature differential between the object's skin and it's core. The greater differential will result in faster heat transfer.

However, it will be appreciated that many objects to be heated or cooled have practical thermal limits that must be respected if the object is to be not damaged. or destroyed by the heating or cooling process. The most common limits that must be considered are the maximum and minimum temperatures that the skin of the mass can tolerate, and the maximum skin to core temperature differential (thermal stress) that can be tolerated.

Therefore, there is a limit to the amount of heat that can be added or removed from the skin of a DUT during the heating or cooling process without exceeding the thermal limits of the object. Controlling the temperature of the skin of a DUT to that limit will allow the maximum rate of heat transfer to/from the object's core while still respecting the limits of the object's skin. If there is a thermal differential limit as well, then the skin temperature may have to be further restrained to remain within that limit.

Another factor that must be considered is the so-called "latency" of the heating or cooling process. As discussed in greater detail below, if the skin of a DUT is subjected to a more extreme temperature than that desired in the object's core until such time as the core achieves the desired temperature, then the core will be at the desired temperature but the skin will be at a more extreme temperature with the mass between the two areas having a temperature gradient therebetween. If no more heat is added or removed, the entire mass will then equalize in temperature over time. The equalized temperature will be more extreme than the core temperature desired.

Referring again to the example of roasting meat, if a given internal or core temperature is desired, and the meat is roasted at a higher temperature than the desired core temperature, the oven may be turned off when the core temperature has reached a value somewhat less than the desired value. After the oven is turned off, the core temperature will climb to the desired value while the skin region transfers the last of its excess heat to the core in the process of thermal equalization. It should be noted, however, that while this approach may be useful in roasting meat where the allowable tolerances are comparatively high, it is not useful in most thermal conditioning applications having more limited allowable tolerances, and where there is generally little experiential basis for the applying the technique.

To change the core temperature of a DUT undergoing conditioning, the skin of the object is typically exposed to a conductive or convective controlled temperature mass that transfers heat to/from the skin. It is the temperature of this external mass that must be controlled to achieve the desired heat transfer to/from the core of the object. Due to the thermal conductivity and mass of the object there is often substantial thermal latency in the transfer process. One reliable way to achieve the desired core temperature without "overshooting", is to regulate the skin's thermal environment such that as the object's core approaches the desired temperature the object's skin temperature is forced to approach the same temperature. As the desired temperature is reached, the temperature difference between the core region and skin region approaches zero and heat transfer effectively ceases. See FIG. 1, which illustrates the response of an exemplary prior art thermal conditioning system.

The typical prior art method, used for achieving this type of convergent control is to measure the temperature of the thermal environment that acts upon the object's skin and also measure the temperature of the DUTs core. When determining whether to add or remove heat from the thermal environment, it is the average of the two temperatures that is compared to the temperature objective to make the determination. Thus, the environment will be thermally over-driven by the amount the DUTs core varies from the desired temperature. As the DUTs core approaches the desired temperature, the average of the two temperatures will require that the DUTs environment approach the desired core temperature at the same rate.

The temperature averaging method described above has the substantial disadvantage that it has no method for respecting the thermal limitations of the device in which the thermal environment is created, nor does it respect the thermal limits of the DUT being conditioned. It is quite possible for the averaging method to call for additional heating/cooling when either the skin of the device being conditioned, or the conditioning device itself is already at or beyond its limits. Substantial damage to property and risk to operators results from the unrestrained use of such averaging methods.

Therefore, to make effective use of this type of averaging method, it is imperative that the output from the control system that is using the average temperature to call for heating or cooling be restrained if that output calls for the addition or removal of heat in a manner that would cause the limits of the thermal conditioning device, or the DUT, to be exceeded. If the temperature control system is a simple "on/off" thermostat type control, externally restraining the control system output will be satisfactory. However, if the control method being used is a more sophisticated method designed around a closed feedback loop that allows the control system to adapt or modify its control output based upon the results of its prior operation, then the external restraining of the control outputs can be disastrous.

Almost all precision temperature control systems involve a method that uses process result feedback in some type of closed loop to adaptively regulate temperature while adjusting for the thermal response of the environment/device being controlled. The feedback loop, and the analysis of the feedback data over time, is the essence of closed loop temperature process control. It is therefore clear that any system that uses such a control method would suffer substantially if its output was externally restrained or "clipped," since the external clipping of the output would result in substantial variation to the result of the control system's output. To tolerate this kind of modification of the output signal by an external system, the primary control system would have to be fed accurate data as to the magnitude and timing of the clipping. Even if this was done, the system required to cope with this additional data would be substantial and burdensome at best. As a result, "clipping" types of control systems are inappropriate for closed loop thermal systems except in very limited situations.

Based on the foregoing, an improved method and apparatus for controlling the temperature of the thermal conditioning device is needed. Such an improved method and apparatus would provide accelerated heat transfer by driving the temperature of the thermal environment beyond the desired conditioned device core temperature, and a mechanism for achieving thermal convergence of the environment and the conditioned device core temperatures to prevent "overshoot." These objectives would ideally be accomplished without exceeding the various thermal limits imposed by the conditioning device or the conditioned device; and would not interfere with the control feedback loop of the temperature control system.

SUMMARY OF THE INVENTION

The present invention satisfies the aforementioned needs by providing an improved temperature control method and apparatus useful in the thermal conditioning of devices.

In a first aspect of the invention, an improved method of controlling the environmental parameters of a device under test (DUT) is disclosed which incorporates the calculation of a moveable temperature setpoint which will 1) maximize the speed of the thermal test or conditioning routine; 2) respect the limits of the DUT with respect to both absolute skin temperature limits and thermal stress: 3) respect the thermal limitations of the test or conditioning equipment being used; and 4) maximize the thermal uniformity of the DUT when the user's specified temperature setpoint is reached in the DUT core. In one embodiment, a system operating range (SOR) and DUT operating range (DOR) are calculated based on the thermal and stress limits of the DUT, temperature control system (TCS), and thermal conditioning apparatus. A control setpoint (CSP) which is different than the desired DUT core temperature specified by the user (i.e., the PSP) is then calculated based on the difference between the PSP and the secondary temperature sensing probe input temperature, the value of two predetermined setup parameters, and the relationship between the SOR and DOR, so as to effectuate varying amounts of heat transfer between the thermal conditioning environment and the DUT. As the desired DUT core temperature is approached, movement of the control setpoint is terminated and the differential between core and skin temperature of the DUT reduced accordingly until the user-specified setpoint is reached.

In a second aspect of the invention, a device thermally conditioned using the aforementioned method is disclosed.

In a third aspect of the invention, an algorithm incorporating the method described above is disclosed. In one exemplary embodiment, the computer program is compiled into an object code format which is stored on a magnetic storage medium, and which is capable of being run on a digital computer processor. The algorithm receives inputs (via the host computer system, described below) from instrumentation associated with the thermal conditioning system, such as chamber/device temperature probes, and calculates the Control Setpoint (CSP) which is fed back to the thermal conditioning system to effectuate control of the chamber and device temperature.

In a fourth aspect of the invention, an improved method and algorithm for controlling the temperature differential limits of a device under test (DUT) are disclosed. Specifically, variable differential thermal limits are employed as a function of the core temperature of the DUT in order to control thermal shock to the DUT during various temperature transitions.

In a fifth aspect of the invention, a computer system incorporating the computer program previously described is disclosed. In one embodiment, the computer system comprises a standard microcomputer (personal computer) having a display, magnetic disk drive, microprocessor, internal memory, and input/output port for receiving and transmitting data to and from the computer. The aforementioned computer program is loaded into the internal memory from the storage area and run by the microprocessor to effect temperature control of the DUT. In a second embodiment, a digital processor is integrated with the temperature control system, the above-described computer program being stored within the memory or storage device associated with the processor/TCS.

In a sixth aspect, a thermal conditioning system is disclosed which incorporates the method, computer program, and computer system previously described. In one embodiment, a TCS is operatively coupled to a thermal conditioning chamber having a plurality of temperature probes for measuring the temperature of the conditioning environment as well as that of the DUT. The TCS may be of any compatible configuration including the PID or fuzzy logic types. The computer system previously described is operatively coupled to the TCS, whereby the former receives temperature data and other relevant inputs from the latter, and periodically calculates and provides a control setpoint (CSP) value thereto for control of the thermal conditioning chamber.

DETAILED DESCRIPTION OF THE INVENTION

Reference is now made to the drawings wherein like numerals refer to like parts throughout.

Figure 2:
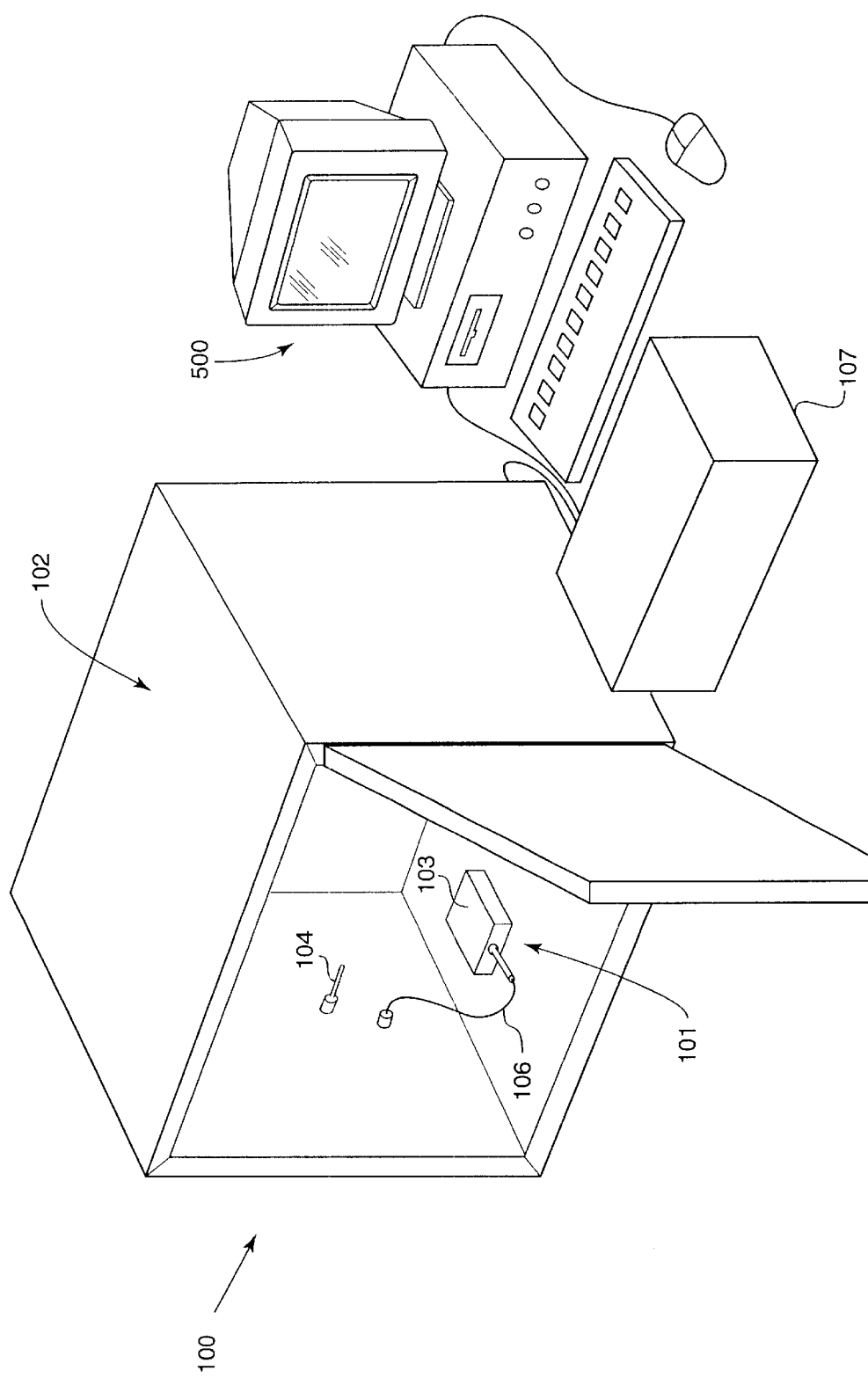
FIG. 2 is a perspective view of a DUT located within a thermal conditioning chamber (oven).

FIG. 2 illustrates an exemplary thermal conditioning system 100 as used in conjunction with the invention disclosed herein. Further shown in FIG. 2 is a so-called "device under test" (DUT) 101, which is thermally tested or conditioned by the system 100, having generally an outer or "skin" region 103, and an internal or "core" region (not shown). For the purposes of this disclosure, the internal temperature of the DUT 101 will be referred to as the "core" temperature, and the outside surface temperature of the DUT will be referred to as the "skin" temperature. Note that the term "core" does not suggest that that the interior of the DUT be necessarily defined by some required unique core material that is differentiated from the surrounding material, although such a differentiation is none-the-less compatible with the present invention. Likewise, the term "skin" does not suggest that the exterior region or surface of the DUT is necessarily defined by some required unique material that is differentiated from the substance interior to it. Rather, these terms merely define the relative thermal positions on or within the DUT.

For convective environments, such as that existing within the thermal conditioning oven of FIG. 2, the skin 103 is that portion of the exterior region of the DUT that is exposed to the convective fluid which is typically, but not necessarily, air.

For conductive environments, such as a thermal platform, the skin 103 is that portion of the exterior region of the DUT that is in contact with the surface of the thermally conductive mass through which heat is to be transferred to/from the DUT.

For radiant environments, the skin is that portion of the exterior region of the DUT which is exposed to the radiation source that is the source for heat transfer.

Note that while the following discussion relates to convective temperature chambers and chamber air temperatures, it will be recognized that the same principles generally apply to thermal platforms (and the platform temperature) as well as radiant heat sources, air forcing systems and similar devices. Similarly, the following discussion will describe the process of heating a DUT, but the concepts apply equally and simultaneously to cooling a DUT.

The DUT 101 is located within a thermal conditioning chamber (oven) 102 of the type well known in the testing and conditioning arts. Primary and secondary temperature probes 104, 106 are also installed within the chamber 102 to measure environmental temperature and DUT core temperature, respectively, as described further below. A temperature control system (TCS) 107 and microcomputer 500 are also operatively attached to the chamber 102 to provide control of the environment within the chamber via the chamber heating and cooling elements (not shown). Additional discussion of the microcomputer 500 and thermal conditioning system architecture are presented below with respect to FIGS. 6 and 7, respectively.

The DUT 101 illustrated in FIG. 2 is an integrated circuit, although it will be appreciated that a large variety of different types of devices may be tested and/or conditioned.

Figure 3:
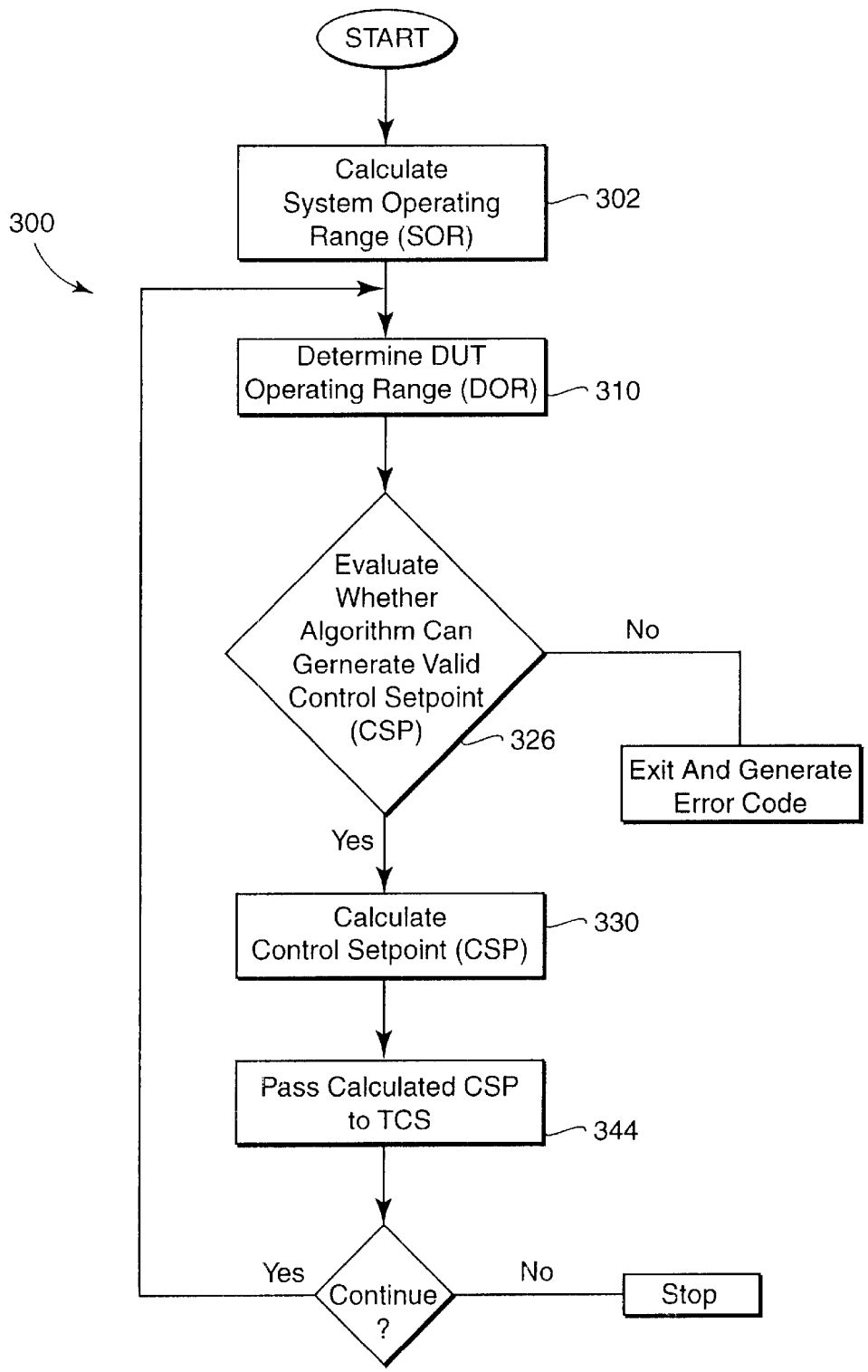
FIG. 3 is logical flow diagram illustrating the process steps associated with one exemplary embodiment of the method of the present invention.
Figure 3A:
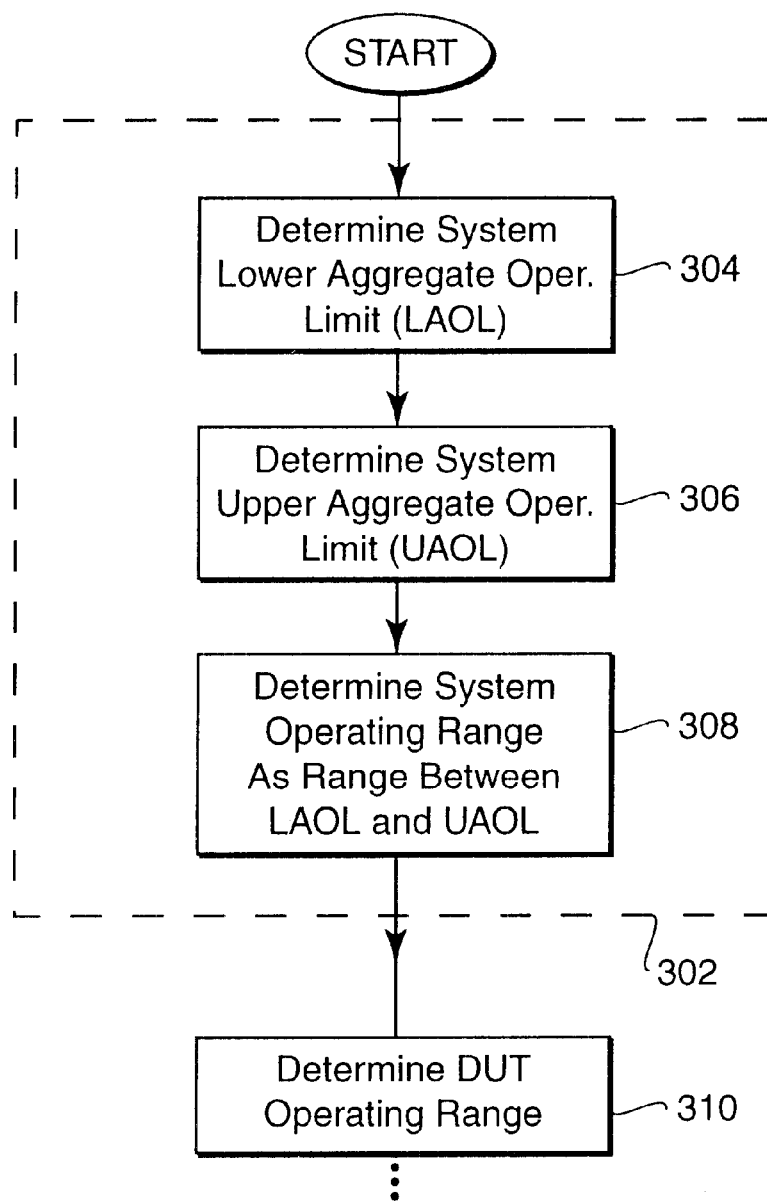
FIG. 3a–3d are logical flow diagrams detailing the individual process steps of the method of FIG. 3.
Figure 3B:
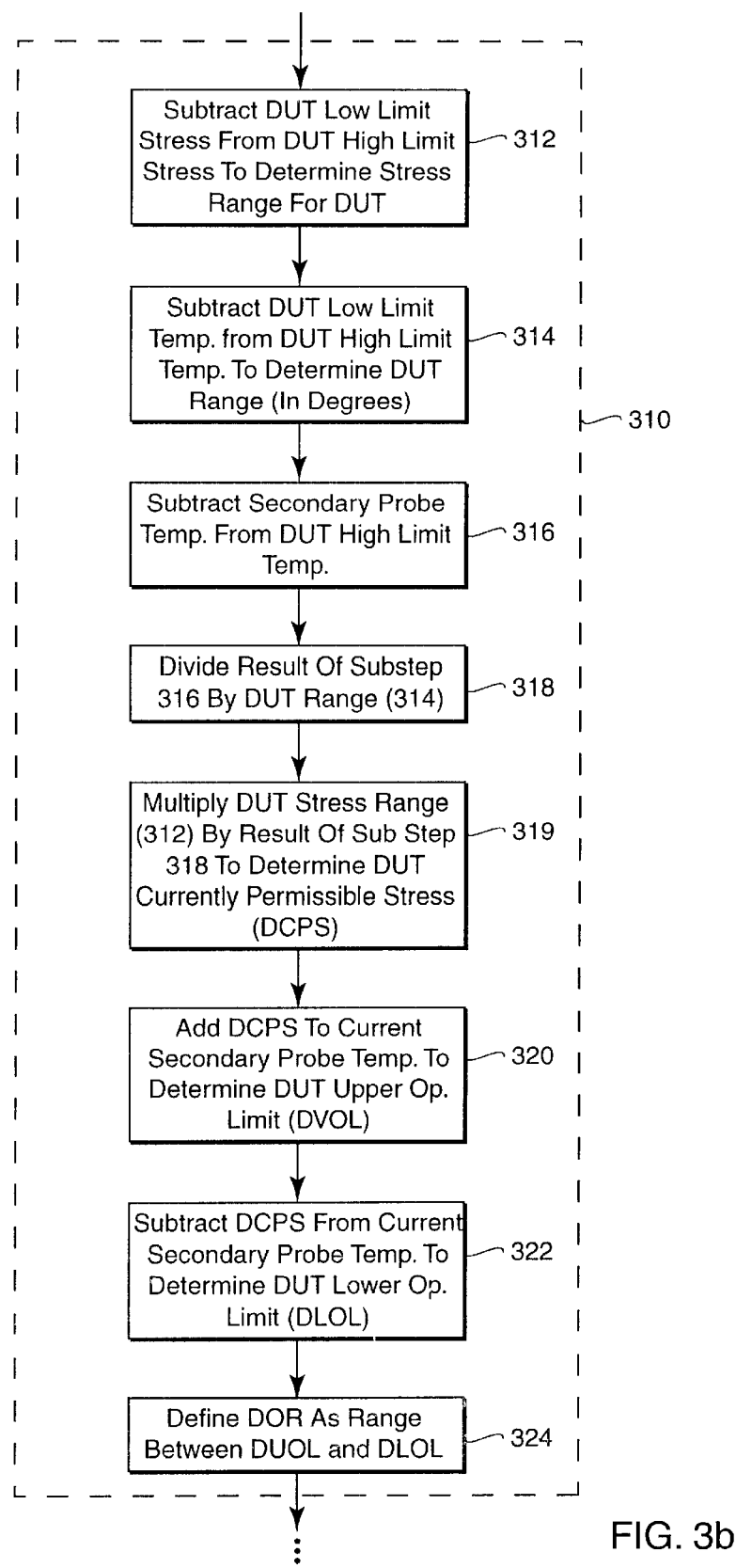

Referring now to FIG. 3, an exemplary embodiment of the method of controlling the temperature of a DUT according to the present invention is illustrated. More specifically, FIG. 3 illustrates a method for determining, in a thermal test or conditioning system, an environment temperature for a DUT such that the DUT will achieve a specified internal temperature or experience a specified internal temperature rate of change (ramp rate) as quickly as possible without violating the various temperature constraints specified by the user. It should be noted that this method is not a control system method such as those employed in prior art "PID loop" or "fuzzy logic" control systems. Such control systems and their associated algorithms are concerned primarily with the application of heating and cooling sources to an environment to best achieve a desired temperature under various conditions. Those control systems and algorithms are responsible, for example, for turning heaters on and off and for introducing cooling agents such as cryogenic coolants to the environment to achieve the desired environment temperature.

Rather, the method and algorithm of the present invention is designed to supply information to such control systems to direct the PID loop or fuzzy logic control as to what the environment temperature should be. Because heat transfer only occurs when there is a thermal differential between two bodies, or two parts of the same body, the optimum environment temperature is seldom the same as the desired DUT temperature, especially during thermal transitions of the DUT. The method and algorithm described herein defines a method for determining an effective, and often changing, environment temperature to achieve the desired thermal results in the DUT.

In the present context, the term "setpoint" is analogous to the term "environment temperature". The setpoint is that temperature which the temperature control system (PID loop, etc.) will attempt to maintain within the thermal environment. It is also assumed for the purposes of this discussion that the proper temperature control system has been selected for use with the present invention. For example, a Sigma Systems Model C4 temperature control system may be used to effectuate control of the DUT, although it will be appreciated that other types and configurations of temperature control system may be used. The construction and operation of such temperature control systems is well known in the relevant art, and accordingly will not be discussed further herein.

For simplicity of analysis, any latency associated with the chosen temperature control system in achieving the chosen setpoint is assumed to be zero (e.g., it is assumed that the setpoint, the environment temperature, and thus the DUT skin temperature, are the same). It will also be recognized, however, that the skin temperature of the DUT and the environment temperature must in actuality be different for heat transfer to take place. This difference is not something that is readily tracked or calculated. Hence, the following discussion assumes that this differential temperature does physically exist and is of sufficient magnitude to effectuate heat transfer from the environment to the skin.

As previously stated, the fundamental concept of the method of the present invention is to supply to the temperature control system a "setpoint", which may change frequently, that is likely different from the user-specified (e.g., DUT core) setpoint, and that will: 1) maximize the speed of the thermal test or conditioning routine; 2) respect the limits of the DUT with respect to both absolute skin temperature limits and thermal stress (skin/core differential); 3) respect the thermal limitations of the test or conditioning equipment being used; and 4) maximize the thermal uniformity of the DUT when the user's specified setpoint is reached in the DUT core. As used herein, the user-specified setpoint will be referred to as the Programmed Setpoint or "PSP", and the generated setpoint supplied by algorithm to the temperature control system will be referred to as the Control Setpoint or "CSP".

As described further below, the method and algorithm of the present invention will periodically determine that the CSP needs to be changed to meet the objectives of the system. In practice, the algorithm invention recalculates the CSP often and supplies the result of its calculations to the TCS as a new CSP. For a good part of the thermal test, especially during periods of thermal transition, the constantly updated CSP may be better thought of as a moving setpoint.

Two issues relating to the use of the present invention to supply a moving CSP to the TCS are considered in the design and operation of the present invention. First, virtually all temperature control systems rely on a series of feedback data from a closed loop to determine the need for heating or cooling. The systems use some type of algorithm to compare the results, over time, of the last output(s) to the feedback data, and use that information for current corrective action and to anticipate future requirements so that these requirements can be included in the current output as appropriate. The more stable the control environment, the more successful the temperature control system is likely to be. Therefore, it is desirable that an algorithm supplying a moving CSP to the TCS do so at a low and constant frequency.

Second, most temperature control systems implement some type of "proportional" or "settling band" (the "P" term of a PID system, for instance) in which the control system reduces the amount of heating or cooling in a proportional, or proportional-like, manner as the desired setpoint is approached. The proportional reduction is further modified by the system as it tries to compensate for the effects of thermal losses, thermal latency, etc. and have the controlled environment settle at the desired setpoint. These systems can become very complex in their methodology and often substantial effort is needed to create routines that will not oscillate unacceptably or show other aberrations as the setpoint is approached. It is important to recognize therefore that any system that supplies the setpoint for such a control routine must not contribute factors which can cause oscillations or other problems or which might, under some circumstances, become sympathetic to and thus amplify existing oscillations.

The present invention addresses both of these issues through (i) the proportional reduction of the CSP/PSP differential as the DUT core temperature approaches the PSP, and (ii) elimination of the movement of the CSP after the PSP is achieved.

For the purposes of this discussion, several additional assumptions are made. First, it is assumed that at least two temperature sensors (e.g., primary and secondary probes 104, 106 of FIG. 2) are available. These sensors can be of any type capable of returning temperature-related data to the controller, as discussed in additional detail with reference to FIG. 7 below. The primary probe is presumed to be within the chamber airstream, and returns a representation of the temperature of the chamber interior environment. The primary probe is the probe used by the TCS to control the temperature of the equipment providing the thermal environment for the DUT. The secondary probe can be one probe, or a series of probes averaged together, that are located inside the DUT, inside a substitute mass of similar thermal characteristics, or otherwise fed representative temperature data. A substitute mass is often used since many types of DUTs may not permit the insertion of a probe into their core region without damage to the DUT. Thus, placing the real DUT in the test or conditioning environment with a thermal "clone" containing the internal secondary probe may be the best available approximation for DUT core temperature data.

Second, it is assumed that the algorithm of the present invention receives input from the user and/or thermal conditioning system in the form of the following information:

1. DUT setpoint (e.g., core temperature desired)
2. High & low temperature limits of the system temperature controller (TCS)
3. High & low temperature limits of the temperature equipment being used (such as a chamber, platform, or other)
4. High & low temperature limits of the DUT
5. Maximum thermal differential (stress) in degrees allowable in the DUT at its low temperature limit
6. Maximum thermal differential (stress) in degrees allowable in the DUT at its high temperature limit
7. The width, in degrees, of the proportional or settling band of the temperature control system Note that all of the information listed above is either readily calculable, available from the DUT/TCS manufacturer, or determinable from instrumentation typically associated with the thermal conditioning system. Accordingly, this information will not be discussed further herein.

Referring again to FIG. 3, the method 300 of the present invention is comprised generally of a series of process steps, several of which may be permuted in order or performed in parallel or series with other steps. Furthermore, under certain circumstances, not all steps need be performed, and alternative steps may be substituted for many of those shown. Additionally, certain mathematical operations performed as part of the method 300 may be replaced by other operations in order to achieve the same result. For example, the difference between two scalar values may be obtained by subtracting the second value from the first, or alternatively subtracting the first from the second and taking the absolute value or changing the sign of the result. The approach set forth in FIG. 3 is therefore merely illustrative of but one exemplary embodiment of the method of the present invention.

In simple terms, the method 300 of FIG. 3 moves the CSP beyond (to a higher temperature, if we are heating the DUT) the PSP by an amount equal to the difference between the PSP and the secondary probe temperature multiplied by a pre-selected first setup parameter (F34). The CSP is then compared to various limits and is further reduced if it exceeds those limits. Specifically, the CSP is compared to the system operating range (defined by the aggregation of the high and low temperature limits of the DUT, the TCS, and the thermal conditioning equipment). If the CSP is outside the system operating range, then the CSP is reduced sufficiently to be within these limits.

Similarly, the permissible DUT stress is determined by proportioning the high and low DUT stress limits based upon a comparison of the secondary probe temperature to the DUT range. If the CSP exceeds the combination of the secondary probe temperature plus the permissible DUT stress, then the CSP is reduced such that it is equal to the secondary probe temperature plus the permissible DUT stress at that temperature. This "final" CSP value is then passed to the temperature control system.

Detailed Description of Method and Associated Algorithm

A detailed description of the method 300 of FIG. 3 is now provided with reference to FIGS. 3a through 3d, and the definitions and assumptions provided herein While the following discussion is cast in terms of the method employed within the Applicant's "Intelligent 2 Probe Control" (hereinafter "I2PC") computer program embodiment, it will be recognized that other algorithms, firmware, or even hardware embodiments of the disclosed method may be used with equal success. It is also noted that while the terms "determine" and "calculate" are used in describing the following method, these terms are not meant to be limited to specific processes. For example, it is contemplated that in lieu of calculating a specific value, such value may be provided by the DUT or TCS manufacturer, or otherwise obtained without the need for explicit calculation.

In the first process step 302 (FIG. 3a), an allowable or System Operating Range (SOR) is determined for the temperature control system. This process step 302 is comprised of several sub-steps 304, 306, 308, as follows. In sub-step 304, a system lower aggregate operating limit (LAOL) is determined as being the higher of the following: (a) the low limit of the system temperature controller; (b) the low limit of the temperature equipment; or (c) the low limit of the DUT. Similarly, in sub-step 306, a system upper aggregate operating limit (UAOL) is determined to be the lower of: (a) the high limit of the system temperature controller; (b) the high limit of the temperature equipment; or (c) the high limit of the DUT. Finally, in sub-step 308, the system operating range (SOR) is defined as the range between and including the LAOL and the UAOL determined in sub-steps 304 and 306.

Note that in the present embodiment, a valid SOR is defined as one where the LAOL is a lower temperature than the UAOL. If this condition is not met, the algorithm exits with and generates an appropriate error code.

Next, in the second process step 310 (FIG. 3b), the allowable or DUT operating range (DOR) is determined by calculating the DUT permissible stress at the current secondary probe temperature. In the first sub-step 312 of the second process step 310, the DUT low limit permissible stress is subtracted from the DUT high limit permissible stress to determine the DUT stress range. In sub-step 314, the DUT low limit temperature is subtracted from the DUT high limit temperature to determine the DUT range in degrees. Next, the secondary probe temperature is subtracted from the DUT high limit temperature in sub-step 316. The percentage of the DUT temperature range represented by the secondary probe temperature is then calculated in sub-step 318 by dividing the result of sub-step 316 by the result of sub-step 314. The DUT currently permissible stress (DCPS) is determined at the current secondary probe temperature (e.g., that of the DUT core) by multiplying the result of sub-step 312 by the result of sub-step 318 and subtracting this product from the high limit permissible stress for the DUT in sub-step 319.

Next, the DUT upper operating limit (DUOL) is calculated by adding the DCPS to the current secondary probe temperature (DUT core) in sub-step 320. Similarly, the DUT lower operating limit (DLOL) is determined by subtracting the DCPS from the current secondary probe temperature in sub-step 322. Finally, in susbtep 324, the DOR is defined as the temperature range between and including the DUOL and the DLOL.

In the third process step 326 (FIG. 3c), the system parameters are evaluated to determine if the I2PC algorithm can operate to generate a valid CSP. It should be noted that in the present embodiment, some portion of the DOR must overlap a portion of the SOR in order for the limits of all devices to be respected. If the core temperature of the DUT plus or minus the permissible stress at that temperature defines a range (e.g., the DOR) that is outside the range that is defined by the SOR (e.g., the limits of the DUT, equipment, and temperature control system) then it will not be possible to determine a setpoint that is within both ranges and thus which respects the limits of both the DUT permissible stress and those associated with the remainder of the temperature control system.

Figure 3C:
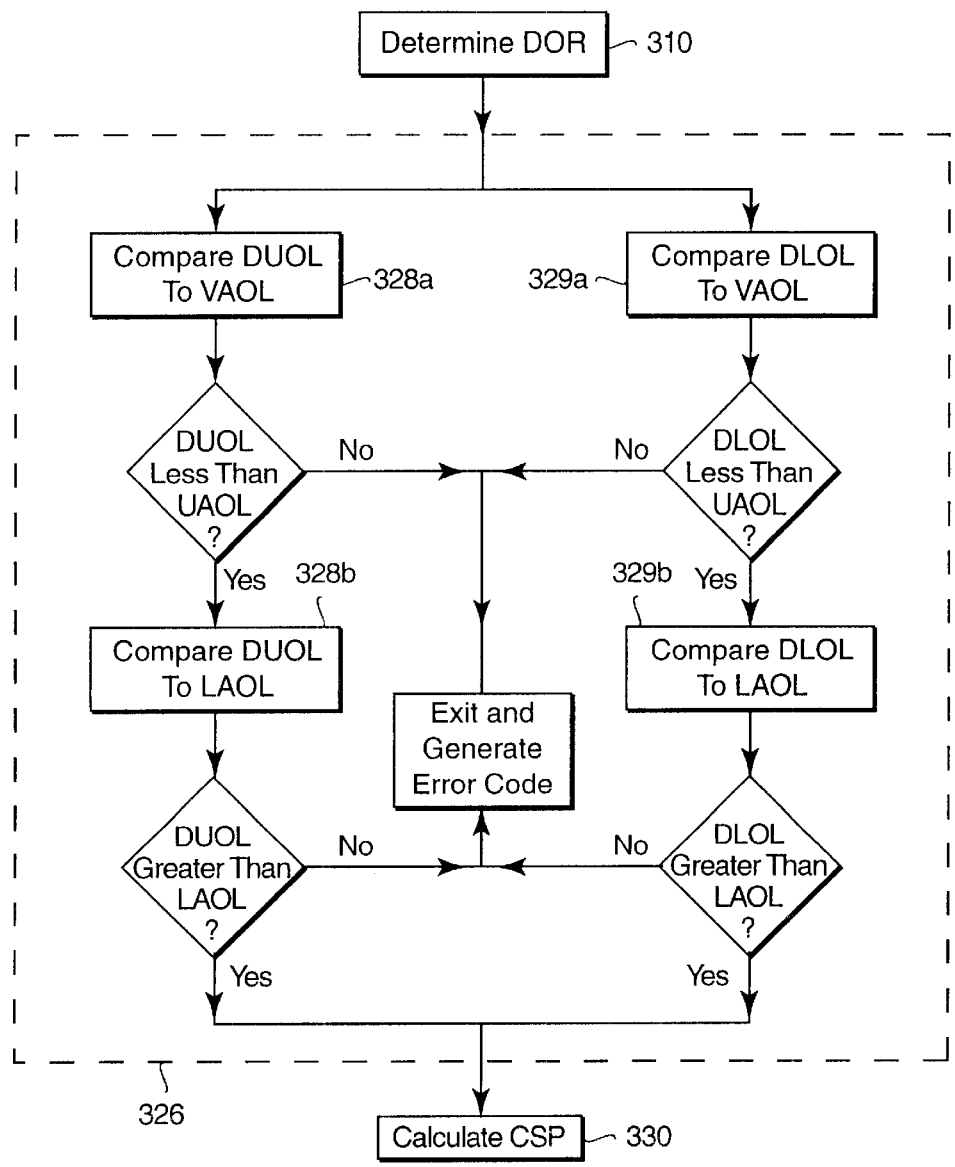
Figure 3D:
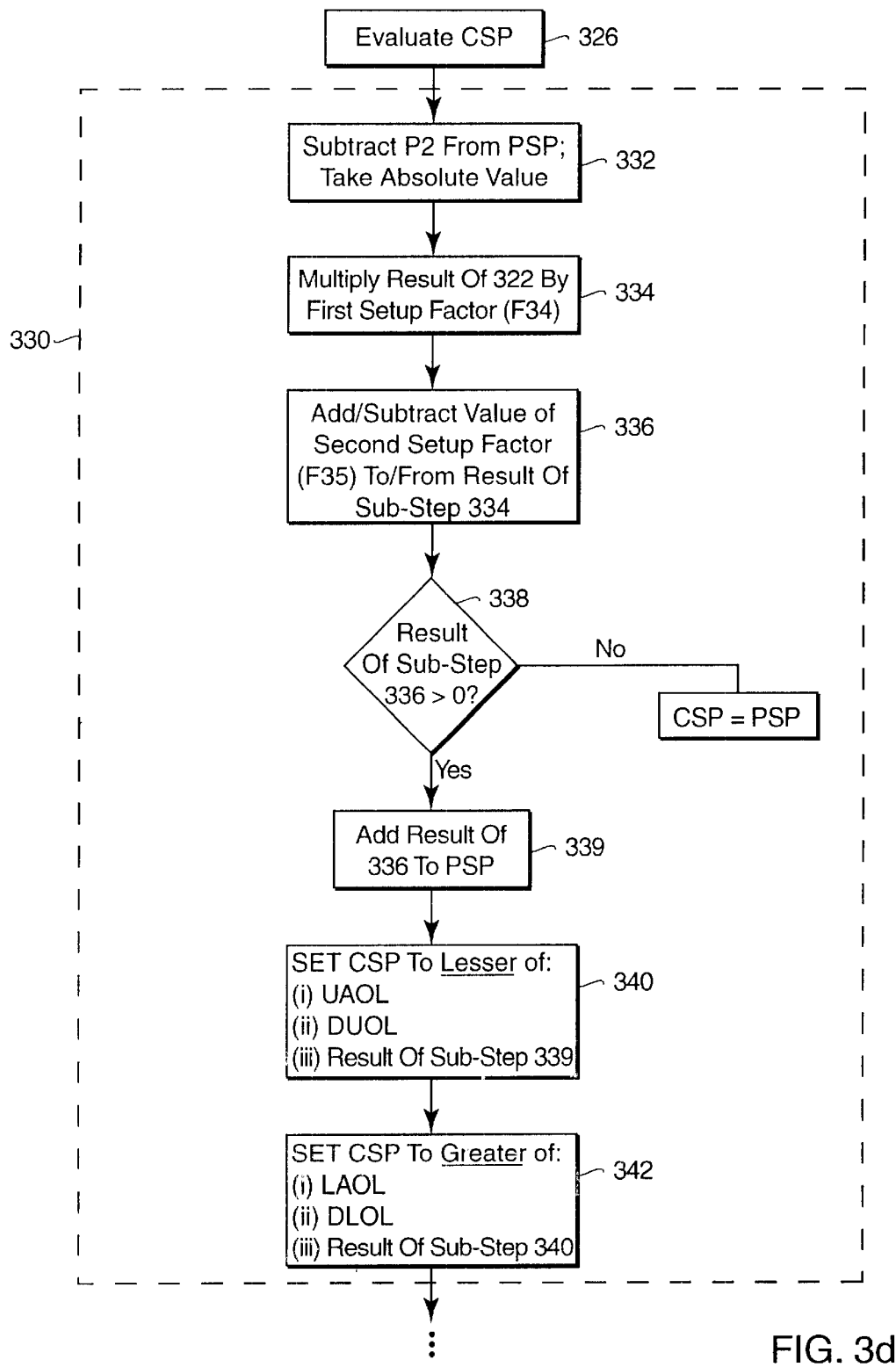

Referring again to FIG. 3c, the DUOL and DLOL are each compared to the UAOL and LAOL in sub-steps 328a, 328b and sub-steps 329a, 329b, respectively, of process step 326. If either: (I) the DUOL is less than the UAOL and greater than the LAOL; or (ii) the DLOL is greater than the LAOL and less than the UAOL, then a valid CSP may be calculated by the algorithm. If neither of these conditions are met, then an error code is generated by the algorithm. It will be appreciated that while a parallel approach to these comparisons is illustrated in FIG. 3c, other methods of comparison and logical relationships may be substituted.

In the fourth process step 330 of the method 300 (FIG. 3d), the Control Setpoint (CSP) is calculated. Initially, the secondary probe value is subtracted from the PSP, and the absolute value of this quantity taken in sub-step 332. In sub-step 334, the aforementioned absolute value is multiplied by a first setup factor (F34). See Appendix A. In step 336, the value of a second setup factor (F35) is added or subtracted as appropriate to the result. The first setup factor acts as a scaling factor or multiplier for the proportional term of the CSP, while the second factor represents a thermal overdrive value (in degrees). In the present embodiment, the first and second setup parameters are numerical values pre-selected or input by the operator, although it can be appreciated that these parameters can be supplied dynamically during the temperature conditioning process from another algorithm or source if desired. Typical values for the first setup factor F34 are in the range of 0.0 to 5.0 (default value=2). Typical values for the second setup factor are −20.0 to +20.0° C. (default=5.0° C.), or −36.0 to +36.0° F. (default 9° F.). The foregoing values are merely illustrative; other values may be chosen.

In sub-steps 338 and 339, the result of sub-step 336 is compared to zero and if greater than zero, is added to the PSP to determine the so-called "unlimited" CSP. Next, the result of sub-step 339 is compared to the UAOL and the DUOL in sub-step 340. The CSP is set to the lesser of these three values (e.g., unlimited CSP, UAOL, and DUOL). Lastly, the result of sub-step 340 above is compared to the LAOL and the DLOL per sub-step 342. The CSP is then set to the greater of these three values. This is the "final" CSP.

In the final process step 344 of the method 300 of FIG. 3, the "final" CSP is passed to the temperature control system for use thereby.

It will further be recognized that the method 300 (and associated algorithm) disclosed herein has several operational attributes which provide advantages over prior art systems and methods. Specifically, the algorithm of the present invention (i) automatically reduces the excess heating/cooling as the DUT core approaches the PSP; and (ii) automatically stops moving the setpoint and enters into normal PID control when either the PSP is reached (within the tolerance of the settling band temperature tolerance parameter F31, described below), or when a predetermined period of time without significant change in the DUT core temperature expires. These attributes are discussed in additional detail below.

Automatic Reduction of Excess Heating/Cooling—Because the CSP exceeds the PSP by an amount related to the difference between the secondary probe and the PSP, the amount the CSP leads the PSP is automatically reduced as the DUT core temperature approaches the PSP. Using the CSP to cause the thermal environment to exceed the PSP results in faster thermal transfer to/from the DUT to the increased differential. Assuming that the DUT skin temperature approaches the environment temperature, the DUT core is the primary beneficiary of the increased heat transfer.

As the DUT core continues to increase in temperature due to this increased differential, the secondary probe temperature (DUT core) begins to approach the PSP. As this occurs, the difference between the PSP and the secondary probe temperature becomes smaller and the CSP is accordingly reduced. All of this will occur with a continuous reduction in the CSP lead of the PSP and thus the environment temperature such that the DUT skin temperature will be reduced as the core temperature is rising. The result is that the skin and core temperatures nearly coincide as the setpoint is reached. The setup parameter F35 allows the operator to account for thermal latency inherent in the DUT, which is related to the heat capacity of the DUT material(s) as well as the thermal conductivity of the material between the DUT skin and core region.

Automatic Termination of Setpoint Movement—Substeps 336 and 338 described above reduce or enlarge the amount of lead of the CSP over the PSP by the amount of the second setup parameter F35 so that when the CSP/PSP difference equals or is less than the magnitude of the setup parameter, the PSP and the CSP are the same value. From this point on in the temperature transition, the system will behave as a one probe system relying on the primary probe in the airstream of the exemplary chamber described herein. When the PSP is reached by the secondary probe, plus or minus the value of the settling band parameter F31, the I2PC algorithm is exited in favor of normal PID control. Thus, when used in conjunction with the present invention, the temperature control system does not have to arbitrate or compensate for a moving setpoint while trying to settle on the user's defined setpoint while inside the settling band.

Additionally, the I2PC algorithm is exited in event that the PSP (+/−F31) is not reached by the secondary probe within a predetermined period of time (i.e., "times out"). This condition is utilized to preclude the algorithm from operating indefinitely in the case where the PSP can not practically be achieved, such as where the maximum rate of heat generation within a test platform is not sufficiently high to offset radiated heat or other losses from the DUT, or where calibration errors within the temperature probes or other equipment exist. In one embodiment, the I2PC algorithm calculates the change in secondary probe temperature over time; if secondary probe temperature does not vary by a predetermined amount within a given period of time, I2PC will be exited. It will be recognized that other "time out" schemes may be used, such as measuring the time from entry of the last user-specified setpoint, or time from achieving a certain percentage of the desired setpoint temperature. Furthermore, while the aforementioned time out function is hard coded into the firmware of the apparatus of the present invention, it will be appreciated that other methods may be used, such as by time out parameters input by the user via software.

The foregoing approach allows a very aggressive thermal overdriving of the system (e.g., environment temperature greater than the DUT core temperature and the PSP) to achieve a desired temperature within a high latency DUT. However, to allow stable PID control, once the DUT has reached or passed through the PSP +/−F31, discontinuing I2PC adjustments allows normal PID control to continue without the risk of interference by the I2PC algorithm. Note that the I2PC algorithm is reinstated with each new setpoint specified by the user. When a new setpoint is specified, the algorithm of the present invention recognizes (1) that a new setpoint has been entered, and (2) the ramp required (i.e., whether the ramp is UP or DOWN), so it knows which way to adjust the CSP.

It should also be noted that the approach of the present invention allows stable and predictable operation of the temperature control system as a whole. Specifically, since the CSP is calculated by the I2PC algorithm on each "loop" of the feedback processing within the TCS (or at another regular interval specified by the operator), a regular variation of CSP results. As previously discussed, the operation of the TCS (and any associated PID or fuzzy logic device) is generally enhanced when corrections are applied in such a periodic fashion.

Figure 1:
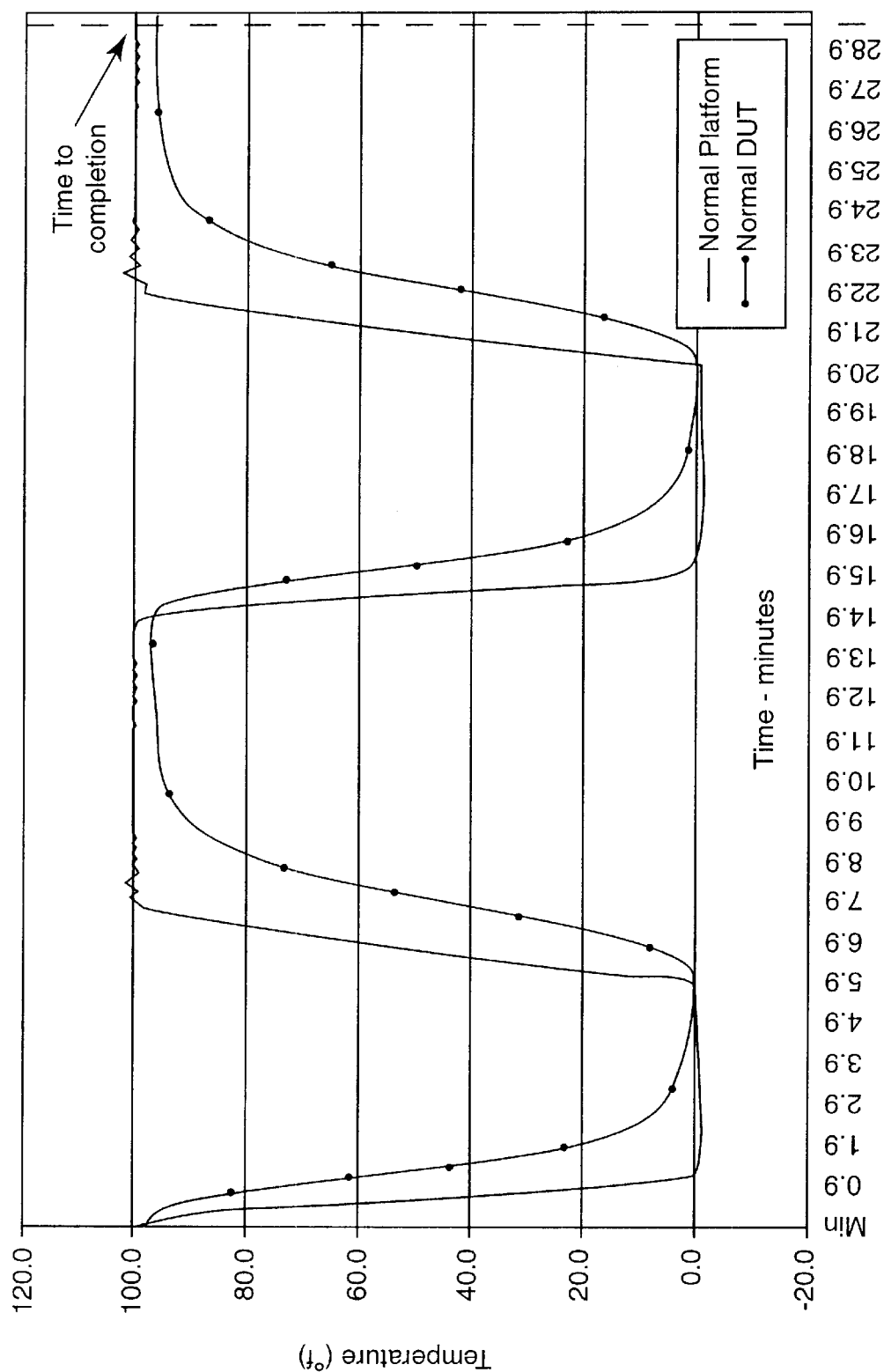
FIG. 1 is a graph illustrating the cyclic temperature response of a typical prior art thermal conditioning system (and DUT being conditioned) as a function of time.
Figure 4:
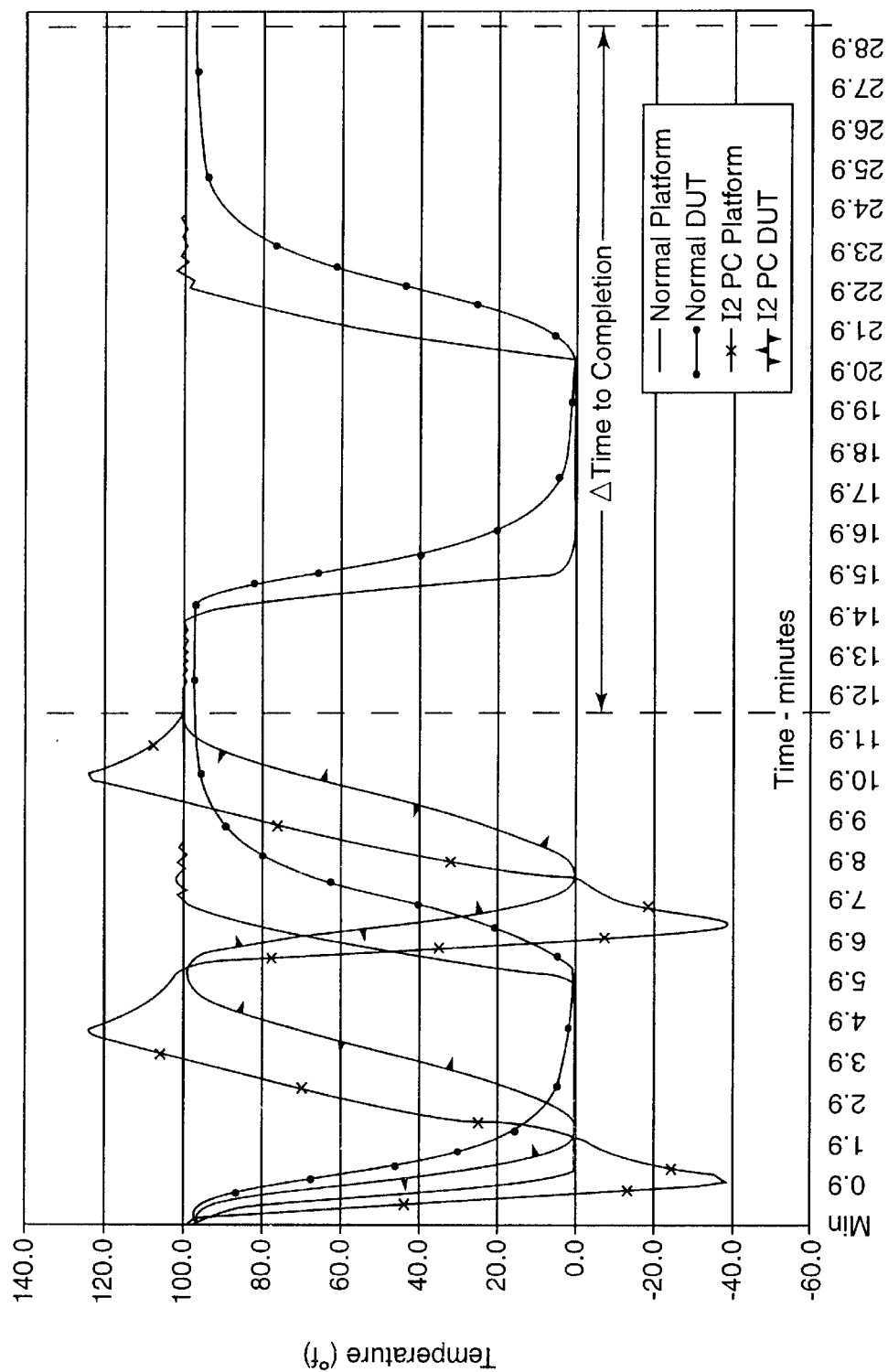
FIG. 4 is a graph illustrating the cyclic temperature response of a temperature control system employing the method of the present invention as compared to that of the prior art system illustrated in FIG. 1.

FIG. 4 illustrates the cyclic temperature response of an exemplary temperature control system employing the method of the present invention, as compared to that of the prior art system illustrated in FIG. 1a. As illustrated in FIG. 4, the I2PC algorithm of the present invention achieves a much more rapid change in DUT core temperature than the prior art system, due primarily to the use of thermal overdrive in the present invention. Note that the prior art system does not use thermal overdrive, but rather ramps the environmental (e.g., chamber or platform) temperature up or down to the PSP, which results in a much lower temperature differential between the environment and the DUT core, and thereby slows the response time of the system. In a cyclic testing scenario where one or more DUTs must be tested or conditioned over many thermal cycles, the time savings and economies afforded by the present invention are substantial. Additionally, as previously noted, the algorithm of the present invention respects the critical thermal differential limits associated with the thermal conditioning system, its controller, and the DUT itself while accomplishing this result.

Appendix A illustrates one embodiment of the aforementioned algorithm according to the present invention.

Description of Variable Differential Limits

Figure 5A:
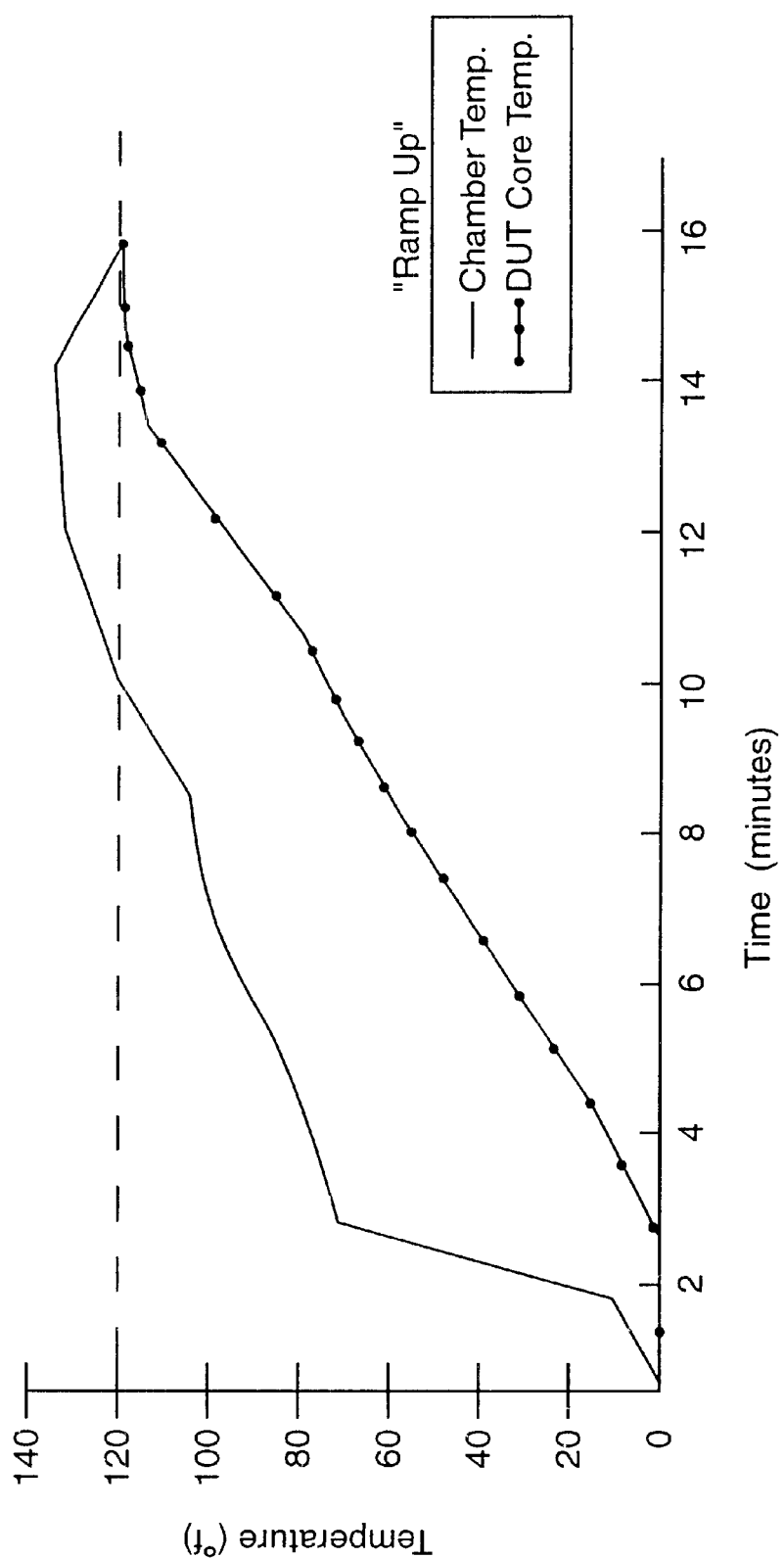
FIGS. 5a and 5b are graphs of the temperature of a thermal platform and the corresponding response of an exemplary DUT when conditioned using variable temperature differential limits during ramp up and ramp down, respectively.
Figure 5B:
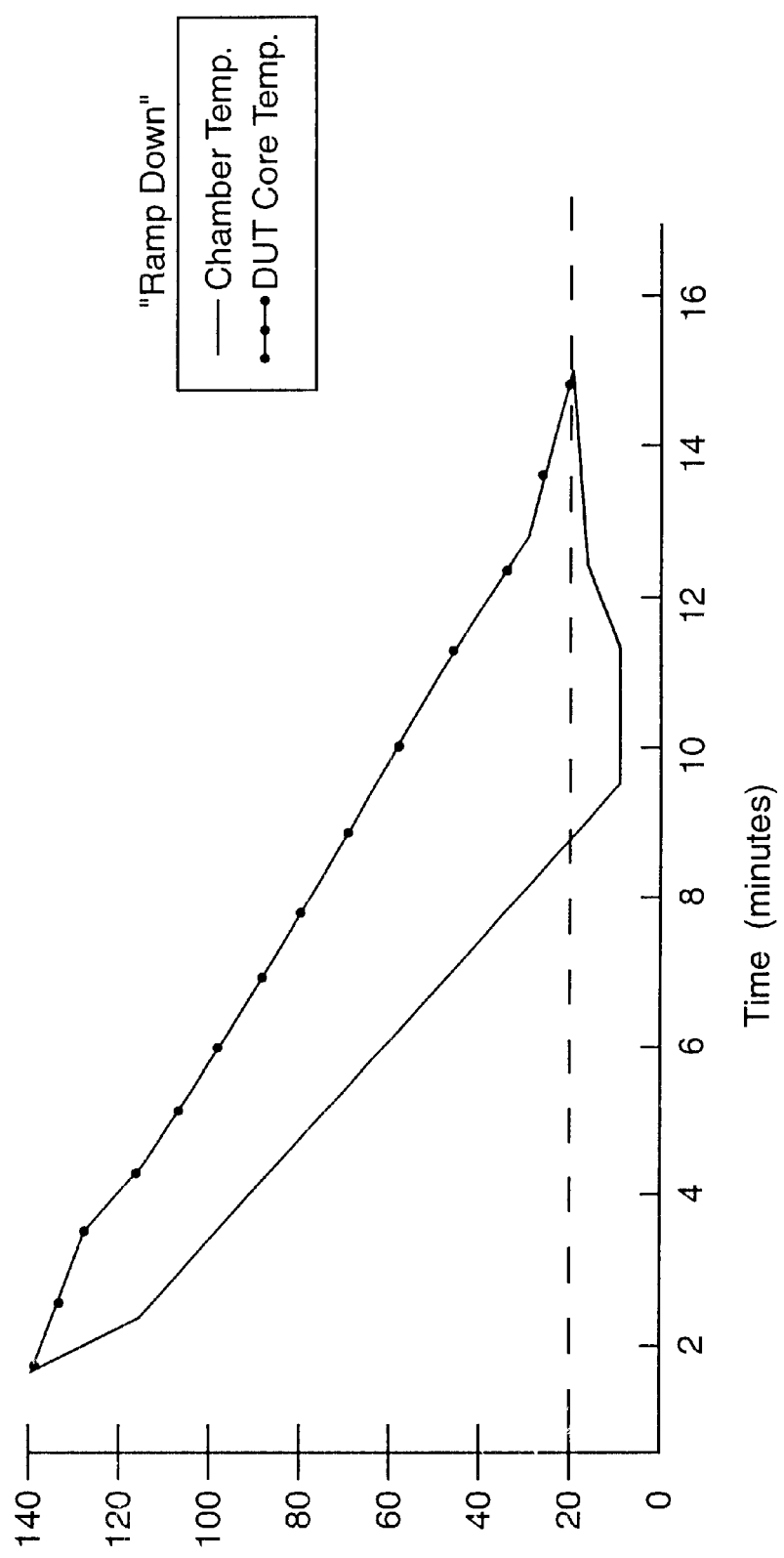

Referring now to FIGS. 5a and 5b, an improved method and algorithm for controlling the temperature differential limits of a device under test (DUT) is described. As shown in FIGS. 5a and 5b, the differential temperature existing between the thermal environment (in the present example, a thermal chamber) and the DUT core temperature varies as a function of the DUT core temperature. This approach is utilized based on the physical property of many DUTs that the maximum allowable differential temperature within the DUT varies as a function of the temperature of the DUT. This property results largely from thermally induced stresses occurring within the materials of the DUT which may damage or impair the DUT if the aforementioned differential temperature limitations are exceeded (i.e., thermal "shock"). For example, at 0° F., a given DUT may be able to sustain a differential temperature of $\Delta T_1°$ F. without excessive thermal stress, whereas at 100° F., the maximum allowable differential is $\Delta T_u°$ F. In the exemplary ramp-up of FIG. 5a, the allowable temperature differential at low temperature is significantly larger than that at high temperature, thereby indicating that the DUT under test is more restricted in heatup/cooldown rate at higher temperatures. In the present embodiment, the allowable lower and upper temperature differentials are calculated based on the absolute lower and upper temperature limits of the DUT; that is, the allowable temperature differentials $\Delta T_1$ and $\Delta T_u$, at the absolute lower and upper temperature limits for the DUT (DOR from step 310 above) are used as end points to "envelope" the entire temperature range. This approach is considered conservative with respect to all allowable temperature differentials between the upper and lower absolute temperature limits. While linear extrapolation between these end points is used in the present embodiment, it will be appreciated that other functional relationships (f(T) in Eqn. 1 above) may be used as well. Note that in contrast to step 310 of the previously described method, in which the absolute temperature limits of the DUT (and thus the DOR) are determined, the specification of variable differential temperature limits seeks to restrain or control the difference between the DUT core and the conditioning environment temperature (e.g., air temperature in the conditioning chamber). The aforementioned variation in allowable temperature differential is preferably accomplished using an algorithm which periodically samples the DUT core temperature (per input received from the secondary probe) and calculates the allowable differential for that temperature based on the user's initial input of (i) lower and upper allowable differential temperatures $\Delta T_1$ and $\Delta T_u$ and (ii) the function f (T). This calculated limit is then imposed upon the system via the CSP, which is adjusted so as to maintain the differential within the prescribed limit.

Description of Computer System and Thermal Conditioning System

Figure 6:
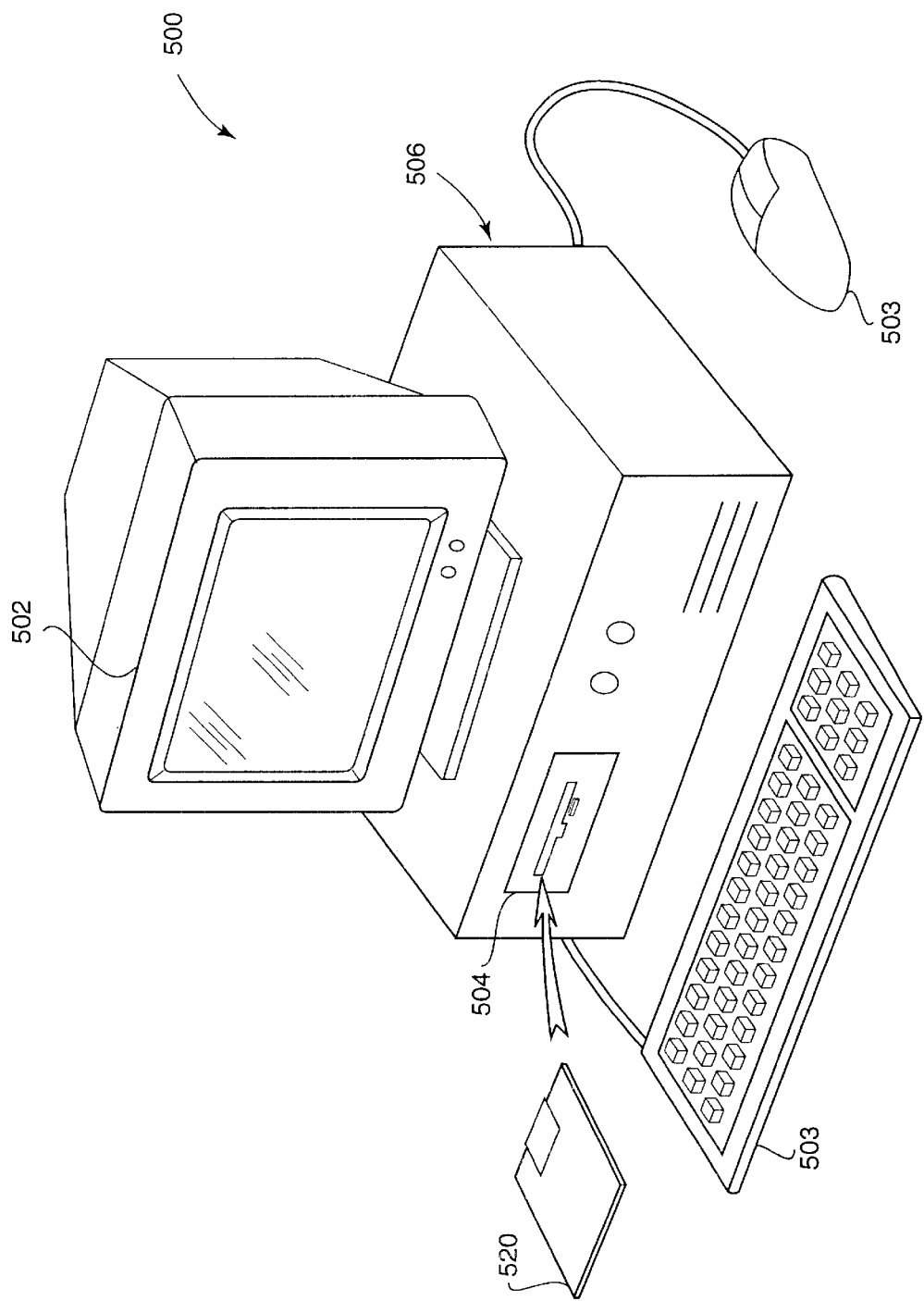
FIG. 6 is a perspective view of a microcomputer system having a computer algorithm incorporating the method of FIG. 3.

FIG. 6 illustrates one exemplary embodiment of the algorithm of the present invention as installed on a microcomputer system 500. As shown in FIG. 6, the microcomputer system 500 comprises a display 502, input device 503, non-volatile storage device (e.g., magnetic disk drive) 504, and output port 506. Additionally, the system includes a central processor 509 and internal memory 510 (see FIG. 7). The aforementioned temperature control algorithm in the form of a computer program (I2PC) rendered in object code is stored ideally on the disk drive 504 (or a discrete storage medium such as a floppy disk 520 associated therewith), or loaded into the internal memory of the computer system 500, where it may be recalled by the processor and associated peripherals such as a DMA module for execution. The output port 506 is coupled to the temperature control system 107 of FIG. 2, the latter receiving the CSP from the algorithm/processor in the form of data transmitted via the output port 506 and associated data connection, such as a serial port, IEEE-488 (General Purpose Instrument Bus), or Ethernet connection. While the temperature control algorithm in the present embodiment resides within the storage devices of the microcomputer system 500, all or part of the algorithm may also reside within temperature controller of the associated thermal conditioning device (e.g., temperature chamber, thermal platform, thermal chuck, or thermal airstream), or other non-volatile programmable storage device such as an EEPROM which is associated with the temperature control system.

Figure 7:
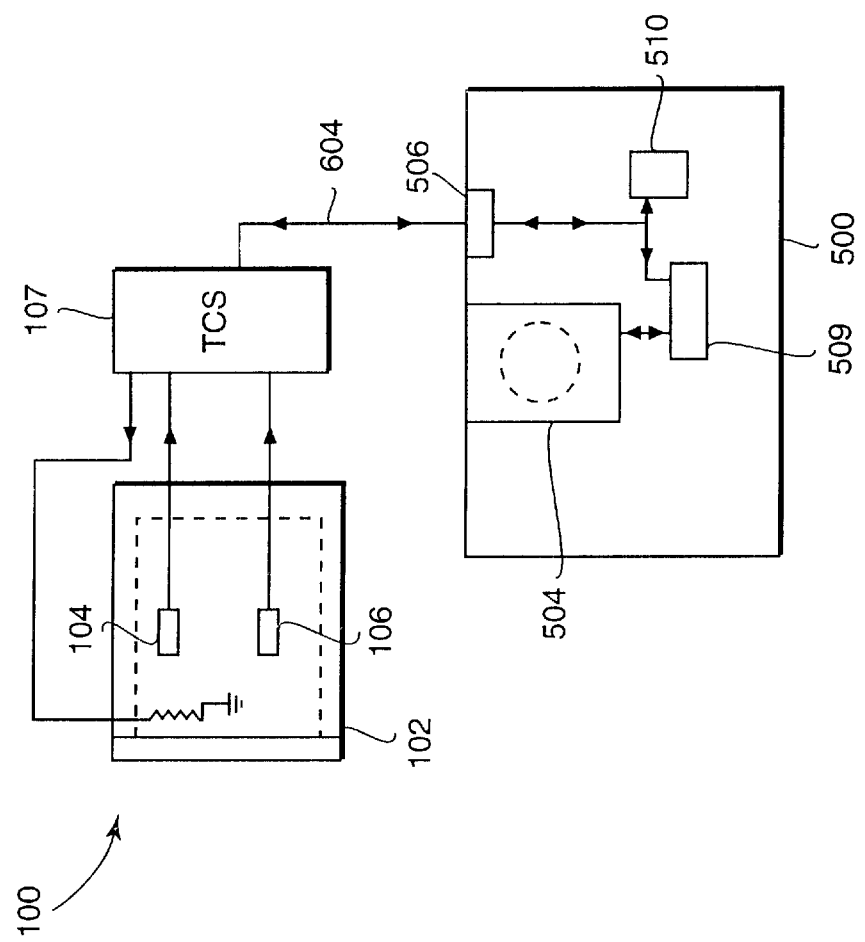
FIG. 7 is a functional block diagram of an exemplary thermal conditioning system incorporating the microcomputer and algorithm of FIG. 6.

Referring now to FIG. 7, an exemplary thermal conditioning system architecture utilizing the microcomputer system of FIG. 6 is described. As illustrated in FIG. 7, the conditioning system 100 comprises the microcomputer system 500 with algorithm (not shown), a temperature control system 107, a thermal conditioning chamber 102, primary and secondary temperature probes 104, 106, and data interface 604. As previously noted, the temperature sensors 104, 106 may be of any type of temperature sensor which generate data related to the temperature of the environment or component being measured, such as a resistance temperature detector (RTD) or thermocouple. The thermal conditioning system 100 of the present invention utilizes two 500 ohm platinum RTD probes, although others may be used as well.

During operation, temperature data obtained from the probes 104, 106 as well as that generated by the TCS 107 is passed to the microcomputer 500 and algorithm wherein the CSP is periodically calculated by the algorithm and passed via the data interface 604 back to the TCS. It will be appreciated by one of ordinary skill in the relevant arts that numerous alternate configurations incorporating hardware, software, and/or firmware may be may be employed in practicing the invention disclosed herein. For example, a thermal platform could be substituted for the conditioning chamber 102 of FIG. 7. Similarly, an algorithm incorporating the method of the present invention could be stored within the internal memory of a digital signal processor located within the TCS 107, or within a remote networked computer, as opposed to using the microcomputer system 500 of FIG. 7.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention.

APPENDIX A

Definitions:

P0=State variable used to initiate I2PC operation

P1=Temperature of primary probe (as adjusted by F17–20)

[Note: P1 may also be used as a control mode to indicate control by the primary probe only (normal PID control)]

P2=Temperature of secondary probe (as adjusted by F21–F24)

PSP=Programmed setpoint entered by user

CSP=Control (virtual) setpoint generated by algorithm
NSP=New setpoint; state variable that tracks existence of new setpoint for I2PC, and whether the new setpoint is a "ramp up" or a "ramp down" request.
  NSP=0=not a new setpoint or setpoint reached by P2-do not use I2PC
  NSP=1=new setpoint detected-ramp up
  NSP=2=new setpoint detected-ramp down
F34=first setup parameter; used as ABS(PSP-P2) multiplier
F35=second setup parameter; I2PC overdrive/underdrive amount in degrees
Exemplary Program Description:
1. I2PC [Basic I2PC routine for calculating the "unlimited" CSP that will be used for control]:
  IF
    NSP=1 AND (ABS(PSP-P2)*F34+F35)>0; temp is programmed to go up & calculated adjustment>0
  THEN
    CSP=PSP+(ABS(PSP-P2)*F34+F35); move control setpoint up by adjustment amount
  ELSEIF
    NSP=2 AND (ABS(PSP-P2)*F34+F35)>0; temp is programmed to go down & calculated adjustment>0
  THEN
    CSP=PSP-(ABS(PSP-P2)*F34+F35); move control setpoint down by adjustment amount.
  ELSE
    CSP=PSP; control setpoint same as the programmed setpoint
  ENDIF
2. New Setpoint Entry [Immediately after entry of a new setpoint in P0 (I2PC) mode]:
  IF
    P2<PSP; indicates request for ramp us
  THEN
    Set NSP=1; set flag indicating a new "ramp up" setpoint has been entered
  ELSEIF
    P2>PSP; indicates request for ramp down
  THEN
    Set NSP=2; set flag indicating a new "ramp down" setpoint has been entered
  ELSE
    Set NSP=0; set flag indicating no new setpoint for I2PC
  ENDIF
3. ControlStart [This is the entry point for the I2PC routine for each control cycle]:
  IF
    NSP=0; no I2PC setpoint, or setpoint already satisfied
  THEN
    GOTO P1 Control; branch to normal primary probe control
  ENDIF
  IF NSP=1 AND P2=>PSP; I2PC was ramping up & secondary probe achieved or exceeded the programmed setpoint
  OR
    NSP=2 AND P2<=PSP; I2PC was ramping down & secondary probe achieved or exceeded the programmed setpoint
  THEN
    NSP=0
  ENDIF

What is claimed is:

1. A method of controlling the temperature of an object using a temperature control system, comprising:
  providing data related to the temperature of said object;
  determining the allowable operating range of said temperature control system;
  determining the allowable operating range associated with said object based at least in part on said data;
  calculating a control setpoint based at least in part on said allowable operating ranges of said temperature control system and said object; and
  providing said control setpoint to said temperature control system in order to control the temperature of said object.

2. The method of claim 1, wherein the act of determining the allowable operating range of said temperature control system comprises;
  determining a system lower operating limit;
  determining a system upper operating limit; and
  defining a system operating range based on said lower and said upper operating limits.

3. The method of claim 2, wherein said act of determining the system lower operating limit comprises selecting the higher of the following: (i) the low limit of the system temperature controller; (ii) the low limit of the temperature equipment; or (iii) the low limit of the object.

4. The method of claim 2, wherein said act of determining the system upper operating limit comprises selecting the lower of the following: (i) the high limit of the system temperature controller; (ii) the high limit of the temperature equipment; or (iii) the high limit of the object.

5. The method of claim 1, wherein the act of determining the allowable operating range associated with said object comprises:
  calculating the permissible stress range of the object;
  calculating the permissible temperature range of the object;
  calculating the difference between the temperature obtained from the object core, and the high limit temperature of the object;
  calculating the permissible stress of the object at said temperature obtained from the object core;
  calculating an object upper operating limit,
  calculating an object lower operating limit; and
  calculating the allowable operating range based on said upper operating limit and said lower operating limit of said object.

6. The method of claim 5, further comprising the act of calculating the relationship between said temperature obtained from the object core and said temperature range of the object, and using said relationship in calculating the permissible stress of the object.

7. The method of claim 6, wherein said relationship comprises the ratio of said temperature obtained from the object core to said temperature range of the object.

8. The method of claim 1, where the act of calculating a control setpoint comprises:
  obtaining data from at least one temperature sensor, said data being indicative of the temperature of the core of said object;
  obtaining a difference between said data and a desired setpoint;
  adjusting said difference using at least one factor to produce a temperature correction; and
  combining said temperature correction with said desired setpoint to obtain said control setpoint value.

9. A method of controlling the temperature of an object using a temperature control system, said temperature control system having a temperature control algorithm providing input thereto, comprising:
   providing data related to the internal temperature of said object to said algorithm;
   determining the allowable operating range associated with said object based at least in part on said data;
   evaluating whether a valid control setpoint can be calculated based at least in part on said allowable operating ranges of said temperature control system and said object;
   calculating said valid control setpoint; and
   providing said control setpoint to said temperature control system.

10. The method of claim 9, wherein the act of evaluating whether a valid control setpoint can be calculated comprises comparing both an upper and lower operating limit of the object to an upper and lower operating limit of the temperature control system.

11. The method of claim 9, wherein said data relating to the internal temperature of the object is obtained using a temperature probe, at least a portion of which is in contact with the interior region of said object.

12. The method of claim 9, wherein said data relating to the internal temperature of the object is obtained from a device having similar thermal characteristics to said object.

13. The method of claim 9, wherein said algorithm comprises a computer program running on a computer system.

14. A thermally conditioned device, said device being conditioned using a method comprising:
   providing a thermal conditioning environment, said environment being controlled at least in part by a temperature control system;
   determining the allowable operating range of said temperature control system;
   exposing said device to said environment;
   generating data related to the temperature of said device and the temperature of said environment;
   determining the allowable operating range associated with said device based at least in part on said data;
   calculating a control setpoint based at least in part on said allowable operating ranges of said temperature control system and said device; and
   providing said control setpoint to said temperature control system so as to control said environment for a period of time.

15. The device of claim 14, wherein the act of determining the allowable operating range of said temperature control system comprises;
   determining the system lower operating limit;
   determining the system upper operating limit; and defining the system operating range as the range between said lower operating limit and said upper operating limit.

16. The device of claim 15, wherein said act of determining the system lower operating limit comprises selecting the higher of the following: (i) the low limit of the system temperature controller, (ii) the low limit of the temp e equipment; or (iii) the low limit of the device.

17. The device of claim 15, wherein said act of determining the system upper operating limit comprises selecting the lower of the following: (i) the high limit of the system temperature controller, (ii) the high limit of the temperature equipment; or (iii) the high limit of the device.

18. The device of claim 14, wherein the act of determining the allowable operating range associated with said device comprises;
   calculating the difference between the device low limit permissible stress and the device high limit permissible stress;
   calculating the difference between the low limit of the device and the high limit of the device to determine the device temperature range;
   calculating the difference between the temperature obtained from the device core, and said high limit of the device;
   calculating the permissible stress of the device at said temperature obtained from the device core;
   calculating an device upper operating limit;
   calculating an device lower operating limit; and
   calculating an allowable operating range based on said device upper and lower operating limits.

19. The device of claim 14, further comprising the act of calculating the relationship between said temperate obtained from the device core and said device temperature range, and using said relationship in calculating the permissible stress of the device.

20. The device of claim 19, wherein said relationship comprises the ratio of said temperature obtained from the device core to said device temperature range.

21. The device of claim 14, where the act of calculating a control setpoint comprises:
   obtaining data from at least one temperate sensor, said data being indicative of the temperature of the core of said device;
   obtaining a difference between said data and a desired setpoint;
   adjusting said difference by a predetermined setup value to obtain an unlimited setpoint value; and
   constraining said unlimited setpoint to a value based on the operating limits of said temperature control system and said device, said constrained value being said control setpoint.

22. A storage medium containing a computer program, said program being useful for controlling the temperature of a device under test via a temperature control system, comprising:
   a storage device capable of storing a computer program;
   a computer program, wherein said computer program;
   receives data related to the temperature of said device;
   determines the allowable operating range of said temperature control system;
   determines the allowable operating range associated with said device based at least in part on said data received;
   calculates a control setpoint based at least in part on said allowable operating ranges of said temperature control system and said device; and
   provides said control setpoint to said temperature control system in order to control the temperature of said device.

23. The storage medium of claim 22, wherein said storage device is a magnetic disk.

24. The storage medium of claim 23, wherein said magnetic disk is a floppy disk.

25. The storage medium of claim 22, wherein said storage device is a programmable computer memory.

26. The storage medium of claim 22, wherein the act of determining the allowable operating range of said temperature control system comprises;

determining the system lower operating limit;

determining the system upper operating limit; and defining a system operating based on said lower and upper operating limits.

27. The storage medium of claim 26, wherein said act of determining the system lower operating limit comprises selecting the higher of the following: (i) the low limit of the system temperature controller; (ii) the low limit of the temperature equipment; or (iii) the low limit of the device.

28. The storage medium of claim 26, wherein said act of determining the system upper operating limit comprises selecting the lower of the following: (i) the high limit of the system temperature controller; (ii) the high limit of the temperature equipment; or (iii) the high limit of the device.

29. A computer system useful for controlling the temperature of an object via a temperature control system, comprising:

a storage device capable of storing a computer program;

a computer program, at least a portion of said program being stored within said storage device, said computer program being capable of receiving data related to the temperature of said object;

determining the allowable operating range of said temperature control system;

determining the allowable operating range associated with said object based at least in part on said data; and calculating a control setpoint based at least in part on said allowable operating ranges of said temperature control system and said object; and a processor capable of running said computer program;

wherein said computer system provides said control setpoint to said temperature control system in order to control the temperature of said object.

30. The computer system of claim 29, wherein said computer system is a microcomputer system having a digital microprocessor, programmable memory, and at least one output port.

31. The computer system of claim 30, wherein said computer system is connected to at least one computer in a networked architecture.

32. A computer system useful for controlling the temperature of an object via a temperature control system, comprising:

means for storing a computer program;

a computer program, at least a portion of said program being stored within said means for storing, said computer program being capable of:

receiving data related to the temperature of said object;

determining the allowable operating range of said temperature control system;

determining the allowable operating range associated with said object based at least in part on said data; and calculating a control setpoint based at least in part on said allowable operating ranges of said temperature control system and said object;

means for running said computer program; and means for transferring data;

wherein said computer system provides said control setpoint to said temperature control system via said means for transferring in order to control the temperature of said object.

33. The method of claim 8, wherein the act of adjusting said difference using at least one factor to produce a temperature correction comprises multiplying said difference by a setup factor.

34. The method of claim 33, wherein the act of combining said temperature correction with said desired setpoint to obtain said control setpoint value comprises adding said temperature correction to said desired setpoint.

35. A method of controlling the temperature of an object using a temperature control system, comprising:

providing data related to the temperature of said object;

determining the allowable operating range of said temperature control system;

determining the allowable differential between said temperature of said object and said temperature control system;

calculating a control setpoint based at least in part on said allowable operating ranges of said temperature control system, said allowable temperature differential, and said data; and providing said control setpoint to said temperature control system in order to control the temperature of said object.

36. The method of claim 35, wherein said act of determining the allowable differential comprises the act of calculating said allowable differential as a function of said temperature of said object.

37. The method of claim 36, wherein said allowable differential is a linear function of said temperature.

38. A method of controlling the temperature of an object using a temperature control system, comprising:

periodically obtaining data related to the temperature of said object;

determining the allowable operating range of said temperature control system;

determining the allowable operating range associated with said object based at least in part on said data;

calculating a control setpoint based at least in part on said allowable operating ranges of said temperature control system and said object; and providing said control setpoint to said temperature control system in order to control the temperature of said object;

wherein said control setpoint is calculated and provided to said temperature control system at substantially regular periodic intervals.

39. A method of controlling the temperature of an object using a temperature control system, comprising:

providing data related to the temperature of said object;

determining the allowable operating range of said temperature control system;

determining the allowable operating range associated with said object based at least in part on said data;

determining a control setpoint based at least in part on said allowable operating ranges of said temperature control system and said object; and providing said control setpoint to said temperature control system in order to control the temperature of said object;

wherein the act of determining the allowable operating range associated with said object comprises:

determining the permissible stress range of the object;

determining the permissible temperature range of the object;

determining the difference between the the obtained from the object core, and the high limit temperature of the object;

determining the permissible stress of the object at said temperature obtained from the object core;

determining an object upper operating limit;
determining an object lower operating limit; and
determining the allowable operating range based on said upper operating limit and said lower operating limit of said object.

40. The method of claim 39, further comprising the act of determining the relationship between said temperature obtained from the object core and said temperature range of the object, and using said relationship in said act of determining the permissible stress of the object.

41. The method of claim 40, wherein said relationship comprises the ratio of said temperature obtained from the object core to said temperature range of the object.

42. The method of claim 39, where the act of determining control setpoint comprises:
obtaining data from at least one temperature sensor, said data being indicative of the temperature of the core of said object;
obtaining a difference between said data and a desired setpoint,
adjusting said difference using at least one factor to produce a temperature correction; and
combining said temperature correction with said desired setpoint to obtain said control setpoint value.

43. A thermally conditioned device, said device being conditioned using a method comprising:
providing a thermal conditioning environment, said environment being controlled at least in part by a temperature control system;
determining the allowable operating range of said temperature control system;
exposing said device to said environment;
generating data related to the temperature of said device and the temperature of said environment;
determining the allowable operating range associated with said device based at least in part on said data;
determining a control setpoint based at least in part on said allowable operating ranges of said temperature control system and said device; and
providing said control setpoint to said temperature control system so as to control said environment for a period of time;
wherein the act of determining the allowable operating range associated with said object comprises:
determining the difference between the device low limit permissible stress and the device high limit permissible stress;
determining the difference between the low limit of the device and the high limit of the device to determine the object temperature range;
determining the difference between the temperature obtained from the device core, and said high limit of the device;
determining the permissible stress of the device at said temperature obtained from the device core;
determining an device upper operating limit;
determining an device lower operating limit; and
determining an allowable operating range based on said device upper and lower operating limits.

44. The device of claim 43, wherein the act of determining the allowable operating range of said temperature control system comprises:
determining the system lower operating limit;
determining the system upper operating limit; and
defining the system operating range as the range between said lower operating limit and said upper operating limit.

45. The device of claim 43, wherein said act of determining the system lower operating limit comprises selecting the higher of the following: (i) the low limit of the system temperature controller; (ii) the low limit of the temperature equipment; or (iii) the low limit of the device.

46. The device of claim 43, wherein said act of determining the system upper operating limit comprises selecting the lower of the following: (i) the high limit of the system temperature controller; (ii) the high limit of the temperature equipment, or (iii) the high limit of the device.

47. A method of controlling the temperature of an object using a temperature control system, comprising:
deter the allowable operating range of said temperature control system;
determining the permissible stress range of the object;
determining the permissible temperature range of the object, including its high limit temperature;
determining the difference between the temperature obtained from the object core, and the high limit temperature of the object;
determining the permissible stress of the object at said temperature obtained from the object core;
determining object upper and lower operating limits based at least in part on said object core temperature and said permissible stress;
determining at least one control setpoint based at least in part on said allowable operating range of said temperature control system and said object upper and lower operating limits; and
providing said control setpoint to said temperature control system in order to control the temperature of said object.

48. The method of claim 47, wherein said act of determining permissible stress comprises:
dividing said difference by said permissible temperature range of said object to produce a first result; and
multiplying said permissible stress range of said object by said first result to produce said permissible stress.

49. A method of determining a control setpoint for use by a temperature control system in controlling the temperature of an object, comprising:
determining the allowable operating range of said temperature control system;
determining the permissible stress range of the object;
determining the permissible temperature range of the object, including its high limit temperature;
determining the difference between the temperature obtained from the object core, and the high limit temperature of the object;
determining the permissible stress of the object at said temperature obtained from the object core;
determining object upper and lower operating limits based at least in part on said object core temperature and said permissible stress; and
determining said control setpoint based at least in part on said allowable operating range of said temperature control system and said object upper and lower operating limits.

50. A thermally conditioned object, said object being conditioned using a method comprising:
providing a thermal conditioning environment, said environment being controlled at least in part by a temperature control system;
determining the allowable operating range of said temperature control system;

exposing said object to said environment;

generating data related to the temperature of said device and the temperature of said environment;

determining the permissible stress range of the object;

determining the permissible temperature range of the object, including its high limit temperature;

determining the difference between the temperature obtained from the object core, and the high limit temperature of the object;

determining the permissible stress of the object at said temperature obtained from the object core;

determining object upper and lower operating limits based at least in part on said object core temperature and said permissible stress;

determining said control setpoint based at least in part on said allowable operating range of said temperature control system and said object upper and lower operating limits; and controlling said environment based at least in part on said control setpoint.

* * * * *

UNITED STATES PATENT AND TRADEMARK OFFICE
CERTIFICATE OF CORRECTION

PATENT NO.    : 6,449,534 B1
DATED         : September 10, 2002
INVENTOR(S)   : Robert T. Stewart It is certified that error appears in the above-identified patent and that said Letters Patent is hereby corrected as shown below:

Column 3,
Lines 58-68, reads:
"In a first aspect of the invention, an improved method of controlling the environmental parameters of a device under test (DUT) is disclosed which incorporates the calculation of a moveable temperature setpoint which will 1) maximize the speed of the thermal test or conditioning routine; 2) respect the limits of the DUT with respect to both absolute skin temperature limits and thermal stress: 3) respect the thermal limitations of the test or conditioning equipment being used; and 4) maximize the thermal uniformity of the DUT when the user's specified temperature setpoint is reached in the DUT core."
Should read:
-- In a first aspect of the invention, an improved method of controlling the temperature of an object using a temperature control system is disclosed. The method generally comprises: providing data related to the temperature of the object; determining the allowable operating range of the temperature control system; determining the allowable operating range associated with the object based at least in part on the data; calculating a control setpoint based at least in part on the allowable operating ranges of the temperature control system and the object; and providing the control setpoint to the temperature control system in order to control the temperature of the object. --

Signed and Sealed this

Twenty-fourth Day of June, 2003

JAMES E. ROGAN
*Director of the United States Patent and Trademark Office*